United States Patent

Verdier

[15] 3,645,316
[45] Feb. 29, 1972

[54] WHEEL RIM FORMED WITH TOOL-RECEIVING GROOVES FACILITATING UNWEDGING OF TIRE

[72] Inventor: Henri Verdier, Puy-de-Dome, France

[73] Assignee: Compagnie Generale des Etablissements Michelin, raison sociale Michelin & Cie, Puy-de-Dome, France

[22] Filed: July 22, 1969

[21] Appl. No.: 843,514

[30] Foreign Application Priority Data

July 23, 1968 France.....................................160332

[52] U.S. Cl...............................................152/410, 301/10
[51] Int. Cl.........................................................B60c 7/24
[58] Field of Search.......................152/401, 406, 409, 410; 301/95, 96, 9 TV, 10

[56] References Cited

UNITED STATES PATENTS

| 1,577,047 | 3/1926 | Putnam | 301/9 TV |
| 1,020,288 | 3/1912 | Kenny | 152/410 X |
| 2,466,449 | 4/1949 | Le Tourneau | 152/410 |
| 2,991,820 | 7/1961 | Bourdon | 152/410 |
| 3,327,754 | 6/1967 | Travers | 152/410 |

FOREIGN PATENTS OR APPLICATIONS 797,586   10/1968   Canada..................................152/409

Primary Examiner—Arthur L. La Point
Assistant Examiner—George H. Libman
Attorney—Brumbaugh, Graves, Donohue & Raymond

[57] ABSTRACT

A wheel rim for engineering equipment includes a rimbase forming one bead seat and supporting a continuous ring forming the other bead seat. A flange is integral with each bead seat, and each flange supports a hoop. Each flange is formed with a ridge delimiting a groove between the ridge and the corresponding hoop.

4 Claims, 1 Drawing Figure

PATENTED FEB 29 1972 3,645,316
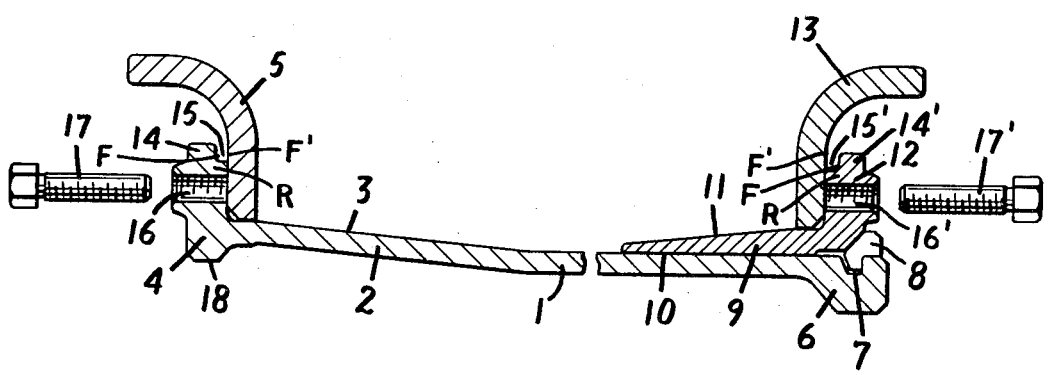
INVENTOR
HENRI VERDIER
BY
Brumbaugh, Graves, Donohue & Raymond
his ATTORNEYS

WHEEL RING FORMED WITH TOOL-RECEIVING GROOVES FACILITATING UNWEDGING OF TIRE

BACKGROUND OF THE INVENTION

This invention relates to rims for mounting tires of automotive vehicles and, more particularly, to novel and highly effective rims for civil engineering equipment intended to be provided with large-size tires.

In the case of rims for mounting large tires of civil engineering equipment, each tire bead bears on a bead set which in general is inclined at an angle of about 5° with respect to the axis of the rim. Each tire bead also rests against a lateral hoop held by a flange integral with the bead seat. The dimensions of the tire bead and of the bead seats on the rim are adjusted in such a manner as to produce forceful securing of the bead on the rim, upon inflation of the tire with air under pressure. This prevents any relative rotation of the tire with respect to the rim due to the very high torques generated when the piece of equipment operates. The more powerful the piece of engineering equipment and the larger the dimensions of the rims and the tires, the more important it becomes to obtain forceful securing of the tire beads on the rim.

The exceedingly tight wedging of the tire beads on the rim poses a problem when the tire must be taken off. The beads must be knocked off or unwedged from their seats rapidly so as not to immobilize a costly machine for too long, and care must be taken that neither the rim nor the tire is damaged.

The conventional expedient adapted to facilitate the removal of the tire and the working loose of the bead involves providing, at intervals along the flange holding the lateral hoop, a bend formed during the stamping or pressing of the flange so as to permit wherever there is a bend the insertion, between the flange and the lateral hoop, of a tool with the help of which the lateral hoop and the tire bead can be pushed back.

This expedient is unsatisfactory because it leads to weakening of the rim in spots. Furthermore, the rim and the lateral ring are subjected during removal of the tire to great localized forces capable of causing permanent deformation or even breaking. Moreover, in accordance with this expedient, the edge can be acted on only in a limited number of points.

SUMMARY OF THE INVENTION

An object of the invention is to remedy the problems outlined above and to provide a rim designed in such a manner as to facilitate a comparatively easy removal of the tire while not comprising any weakened portion or part likely to be deformed during such removal.

The foregoing and other objects are attained in accordance with the invention by the provision of rim comprising on either side a lateral hoop held by a flange integral with the seat of the bead. The bead seat is formed either by the rimbase or by a detachable ring. The flange is characterized in that it contains a circular ridge delimiting a circular groove arranged between such ridge and the surface of the flange intended to come in contact with the lateral hoop.

Preferably, the rim includes the following features:

a. The flanges of the bead seats are reinforced so as to make them substantially thicker than the base of the rim. This greater thickness can be, for example, approximately one and one-half times the thickness of the rim base. Reinforced flanges can be obtained by manufacturing them separately from the base of the rim or the detachable ring forming the bead seats and assembling them by welding to the rimbase or the removable ring;

b. The flange integral with the rimbase is formed with a circular projection extending in relation to the rimbase, in the direction of the axis of the rim. This projection makes it possible to stiffen the rim flange and to increase the moment of inertia of the cross section in relation to the axis of the rim;

c. The flanges are formed with a number of threaded holes, for example, six to twelve, capable of accommodating bolts for pushing back the lateral hoops or keeping them at a distance form the flanges.

BRIEF DESCRIPTION OF THE DRAWING

An understanding of additional aspects of the invention may be gained from a consideration of the following detailed description of a representative embodiment thereof, in conjunction with the appended drawing, wherein the sole FIGURE is a fragmentary radial cross section of a rim in accordance with the invention.

DESCRIPTION OF THE PREFERRED EMBODIMENT

The rim shown in the FIGURE comprises a rimbase 1 one side 2 of which is inclined in relation to the rim axis at an angle of approximately 5° so as to form a bead seat 3 for the tire bead. A flange 4 is perpendicular to the rim axis and serves as a stop for a continuous lateral hoop 5. The flange 4 and rimbase 1 form a monolithic unit. On the other side of the rim, i.e., the so-called removable side, the base of the rim 1 includes an extension in the form of a hook or bracket 6 provided with a channel 7 in which is accommodated a split locking ring 8. Against the ring 8 rests a continuous ring 9 which is capable of sliding axially over a cylindrical portion 10 of the rimbase 1 and which comprises a conical part 11 forming the second tire bead seat and a flange 12 against which rests a second continuous lateral hoop 13.

In accordance with the invention, the flanges 4 and 12 of the bead seats 3 and 11 comprise a circular ridge 14 or 14' which delimits a circular groove 15 or 15' each having substantially parallel faces F and F' which are axially spaced apart since each flange is also formed with a ridge R extending in an axially inward direction. The circular grooves are respectively arranged between the flanges 4 and 12 and the lateral hoops 5 and 13.

These grooves 15 and 15' make it possible to introduce, at any point whatever of the circumference of the flanges 4 and 12 a tool with which the lateral hoops 5 and 13 can be pushed away from the flanges 4 and 12 when the tire is removed and deflated. Since the grooves 15 and 15' are continuous, one can use a tool which has a length of contact with the lateral hoops 5 and 13 and the ridges 14 and 14' limited only by the curvature of the lateral hoops as compared to the tool. Thus, it becomes possible to extend pressure over a comparatively large sector of the lateral hoops and to avoid forces which are too localized.

In accordance with the invention, the flanges 4 and 12 are formed with threaded holes 16 and 16' into which can be screwed bolts 17 and 17', respectively. For a rim of 51 inches, there can be eight to ten threaded holes of 20 mm. diameter, with a pitch of 1.5 mm. The bolts 17, 17' also facilitate the removal of the tire, either by helping the removal tool, supported by the ridges 14 and 14', to push away the lateral hoop, or by keeping at a distance a portion of the lateral hoop previously pushed away. It is thus possible to avoid permanent deformation of the lateral hoop by acting step-by-step over the entire circumference of the lateral hoop, without the need to exert excessive force in certain points in order to obtain loosening.

In accordance with the invention, the flanges 4 and 12 are reinforced and their thickness is substantially greater than the thickness of the rimbase 1 over their entire periphery and not only in certain portions, for example, where the holes 16 or 16' are located. Such reinforcement is desirable in order to prevent strains during tire removal. Flanges obtained by stamping or pressing and having the same thickness as the rimbase 1 are less able to withstand the stresses occurring during tire removal.

Further, in accordance with the invention, the flange 4 comprises a circular projection 18 extending the flange 4 in the direction of the axis of the rim which projection 18 contributes to the reinforcement of the flange 4. In the case of the removable ring 9 and the flange 12, a reinforcement such as the projection 18 is not necessary, since the flange 12 rests on the rim bracket or hook 6.

The reinforced flanges 4 and 12 contribute also, and very importantly, to the strength of the rim 1, which is under greater stress along its edges than in its center part.

Thus there is provided in accordance with the invention a novel and highly effective rim having great advantages especially in use with civil engineering equipment. Many modifications of the preferred embodiment described above will readily occur to those skilled in the art. The invention is to be construed as including all such modifications within the scope of the appended claims.

I claim:

1. A wheel rim for civil engineering equipment intended to be provided with large tires comprising a rimbase, a pair of bead seats, a pair of flanges respectively integral with said bead seats, and a pair of hoops respectively engageable with said flanges, each of said flanges being formed with two ridges, one ridge of each of said flanges extending in a radially outward direction and the other ridge of each of said flanges extending in an axially inward direction, the latter of said ridges respectively engaging said hoops and the former of said ridges respectively forming with the latter of said ridges a pair of tool-receiving circular grooves each having substantially parallel, axially spaced apart radial faces, said grooves being respectively arranged between the corresponding ridge and the corresponding hoop and making it possible to introduce a tool with which said hoops can be pushed away from said flanges.

2. A wheel rim according to claim 1 wherein the thickness of said flanges substantially exceeds that of said rimbase.

3. A wheel rim according to claim 1 wherein said flanges are formed with threaded holes, further comprising threaded bolts for accommodation by said holes, whereby said hoops can be supported in spaced apart relation to said flanges.

4. A wheel rim according to claim 1 wherein one of said flanges and said rimbase are a monolithic unit, said one of said flanges being reinforced by a projection extending towards the axis of said rimbase.

* * * * *